US010996100B2

(12) United States Patent
Mayer et al.

(10) Patent No.: US 10,996,100 B2
(45) Date of Patent: May 4, 2021

(54) METHOD AND APPARATUS FOR CALIBRATING RAIL SCALES

(71) Applicant: Rail Scale, Inc., St. Augustine, FL (US)

(72) Inventors: James Mayer, Leeds, UT (US); Dennis C. Meyers, St. Johns, FL (US); Trace Mayer, Las Vegas, NV (US)

(73) Assignee: Rail Scale, Inc., St. Augustine, FL (US)

( * ) Notice: Subject to any disclaimer, the term of this patent is extended or adjusted under 35 U.S.C. 154(b) by 131 days.

(21) Appl. No.: 16/268,332

(22) Filed: Feb. 5, 2019

(65) Prior Publication Data

US 2020/0249072 A1     Aug. 6, 2020

(51) Int. Cl.
*G01G 23/01*   (2006.01)
*B61D 47/00*   (2006.01)
*B61D 15/00*   (2006.01)
*G01G 21/26*   (2006.01)

(52) U.S. Cl.
CPC ............ *G01G 23/01* (2013.01); *B61D 15/00* (2013.01); *B61D 47/005* (2013.01); *G01G 21/26* (2013.01)

(58) Field of Classification Search
CPC ........ G01G 23/01; G01G 21/26; G01G 19/08; G01G 19/52; G01G 19/02; B62D 5/07; B60G 9/02; B61B 15/00; B61D 47/005
See application file for complete search history.

(56) References Cited

U.S. PATENT DOCUMENTS

| | | | | | |
|---|---|---|---|---|---|
| 1,124,217 | A | * | 1/1915 | Emery | B60P 1/5442 414/542 |
| 4,048,843 | A | * | 9/1977 | Dunbar | G01G 23/01 73/1.13 |
| 4,128,267 | A | * | 12/1978 | Niblett | B66C 1/16 294/81.56 |
| 4,211,297 | A | * | 7/1980 | Dunbar | B60G 9/02 180/24.02 |
| 4,249,633 | A | * | 2/1981 | Dunbar | B60G 9/02 180/24.02 |
| 4,316,696 | A | * | 2/1982 | Hoyerman | G01G 23/01 212/71 |
| 4,347,904 | A | * | 9/1982 | Dunbar | G01G 23/01 177/50 |
| 4,406,338 | A | * | 9/1983 | Dunbar | G01G 19/52 177/145 |

(Continued)

FOREIGN PATENT DOCUMENTS

| | | | | |
|---|---|---|---|---|
| DE | 29621304 | * | 2/1997 | |
| EP | 3187839 A1 | * | 7/2017 | ............ G01G 19/04 |
| JP | 2007-155410 | * | 6/2007 | |

*Primary Examiner* — Helen C Kwok
(74) *Attorney, Agent, or Firm* — Michael B. Dodd; Dodd Law Group, LLC (57) ABSTRACT

An apparatus for calibrating a rail scale is described. The apparatus is attached to a first trailer and a second trailer and the move from a first site to a rail scale site over highways and roads. The apparatus includes a calibration vehicle, bins of weights, and a crane. The crane positions the calibration vehicle, that is self-propelled, on rails and loads weights on the calibration vehicle. The combined weight of the calibration vehicle and weights has qualifying values that ensures a scale is in compliance rail scale calibration standards.

17 Claims, 7 Drawing Sheets

(56) References Cited

U.S. PATENT DOCUMENTS

| | | | | |
|---|---|---|---|---|
| 4,637,481 A * | 1/1987 | Shoemaker | ............ | G01G 23/01 |
| | | | | 177/50 |
| 7,093,729 B2 * | 8/2006 | Monteil | .................. | B66C 23/74 |
| | | | | 212/178 |
| 7,105,751 B2 * | 9/2006 | Terada | .................... | G01G 19/02 |
| | | | | 177/136 |

* cited by examiner

METHOD AND APPARATUS FOR CALIBRATING RAIL SCALES

BACKGROUND

1. Field of the Invention

This invention relates generally to the field of rail scale calibration, and more particularly, to calibrating a rail scale with an apparatus that is transported to the rail scale location using a non-rail-based transportation system.

2. Related Art

The present disclosure is generally directed to calibrating a rail scales that weigh railroad cars. Common rail scales weigh railroad cars having weights in the range of around 20 tons to several hundred tons. After extended use, a rail scale may lose accuracy for a variety of reason such as wear of scale components. Manufacturers of rail scales and owners of rail scales have worked together to ensure customers get accurate weights of railroad cars. That work effort has resulted in calibration procedures published as NIST Handbook 44 and as AAR Scale Handbook. When a rail scale is calibrated following processes and procedures provided in these handbooks, the rail scale provides railroad car weights that are acceptable to interested parties.

Because of the environment in which a rail scale is typically used, dirt can build up on mechanical linkages and friction may wear on the mechanical linkages, thereby changing the component parameters that often results in inaccurate weight measurements. Further, normal wear on mechanical and electrical components may also cause the scale to give inaccurate weights. When components wear occurs, a rail scale may provide a weight that deviates (by more than acceptable tolerances) from the actual weight of the load. Similarly, drift in the components of electronic scales may result in a weight reading that does not correspond with the actual weight.

Accuracy of railroad car weight is particularly important when such weight involves commercial transactions. For example, railroad cars may carry bulk materials such as grains, sand, gravel, and similar materials. Hence, it is necessary that all stakeholders, such as sellers, buyers, transporters, end users, and others have confidence that bulk materials are weighed accurately. Further, when items, such as, freight containers, equipment, automobiles, and other items are shipped by rail the corresponding cost of shipment is based on weight.

Rail scales are scattered throughout rail systems. Conventional calibration vehicles are fully rail based making it difficult and often expensive to provide calibration at many of rail scale sites. In general, when a request for calibration of a rail scale is urgent that request must be fulfilled in a timely manner. Conventional calibration vehicles are incumbered with delays that are characteristics of rail system operations including scheduling delays, route availability, navigating levels of bureaucracy, and other factors. A conventional calibration vehicle may provide an acceptable calibration service if calibration is scheduled in advance as part of periodic scale maintenance. If the location of a rail-based calibration vehicle is near the site of rail scale, then a rail-based calibration process may be acceptable from both cost and time considerations. However, if the conventional calibration vehicle location is not near the rail scale then burdensome arrangements are often needed to get the vehicle to the rail scale location.

BRIEF DESCRIPTION OF THE DRAWINGS

The specific features, aspects and advantages of the present invention will become better understood with regards to the following description and accompanying drawings where.

DETAILED DESCRIPTION

The present disclosure describes an apparatus for calibrating a rail scale comprising a calibration vehicle with a container for holding weights, wherein the car is self-propelled such that the calibration vehicle can move along a railroad track to a rail scale. Further, the apparatus as described herein does not depend on the rail system for transport between rail scale locations. The calibration vehicle and the weights have certified weight values and provide for rail scale certification in compliance with calibration standards. The apparatus and corresponding method meet the NIST Handbook 44 and the AAR Scale Handbook requirements and is accomplished in a timely manner and generally cost less than the conventional rail scale calibration process.

Figure 1:
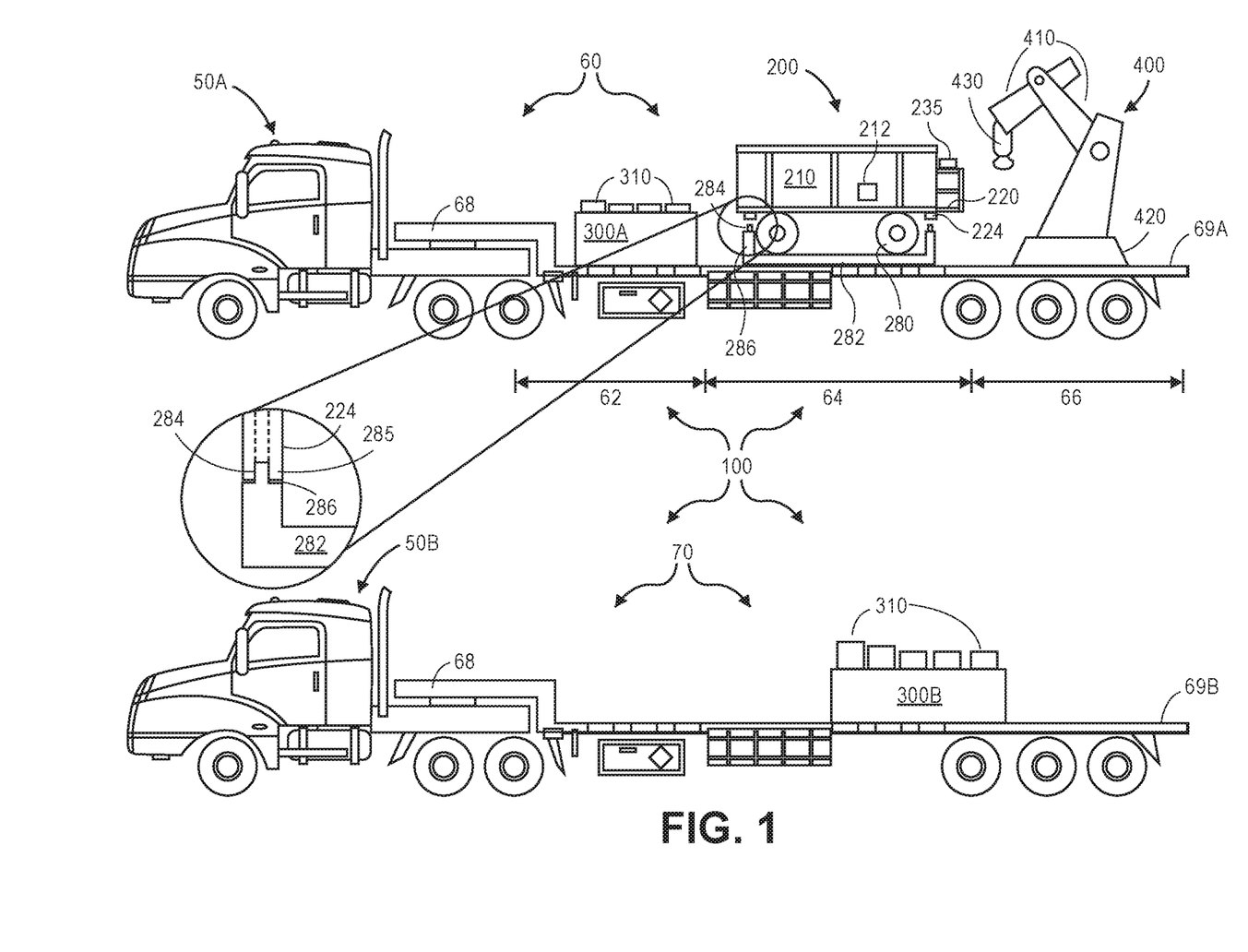
FIG. 1 depicts an apparatus for transporting a calibration vehicle and weights in accordance with the present disclosure.

FIG. 1 depicts an apparatus 100 for calibration of a rail scale that is configured for transport from one site to another site over the roads used by cars, trucks and buses. The apparatus 100 comprises a trailer 60 with calibration vehicle 200, a weight bin 300A containing weights 310, and crane 400 and a trailer 70 with weight bin 300B containing additional weights 310. Trailers 60 and 70 are coupled, by a tractor-trailer coupling 68, to tractors 50A and 50B respectively that pull the trailer 60 and 70 over roadways that include interstate highways, state highways, county, city and private roads. Each tractor 50A and 50B and corresponding trailer 60 and 70 comply with size and weight restrictions set by the laws and regulations of each entity having jurisdiction over the roads.

Throughout this description and the following claims, it is to be understood that human drivers can operate tractors 50A and 50B to transport trailers 60 and 70 via roadways and park trailers 60 and 70 adjacent to one another. Throughout this description and the following claims, it is to be understood that a human operator can operate crane 400 (which may or may not be a driver of tractor 50A or 50B) to connect to objects, to load and unload objects from trailers 60 and 70, and to load and unload objects from a railroad track. Throughout this description and the following claims, it is to be understood that a human operator can operate calibration vehicle 200 (which may or may not be a driver of tractor 50A or 50B or an operator of crane 400). Thus, the described operations of tractors 50A and 50B, of crane 400, and of calibration vehicle 200 may be caused by humans controlling tractors 50A and 50B, crane 400, and calibration vehicle 200 (even if these human activities are not expressly described).

Trailer 60 is a flatbed trailer with a floor 69A and having a front section 62, a middle section 64, and a back section 66. Weight bin 300A is securely fastened to floor 69A in front section 62 of trailer 60. Weight bin 300A contain multiple calibrated weights 310. In one aspect, bin 300A has capacity to store 16 weights 310 (however other capacities for bin 300A are also contemplated). Calibration vehicle 200 (e.g., a motorized and relatively smaller railroad compatible cart) is coupled to retainer 282 that is securely fastened to the floor 69A in middle section 64 of trailer 60. Crane 400 is securely fastened to floor 69A in back section 66 of trailer 60. The arrangement of weight bin 300, calibration vehicle 200, and crane 400 is advantageous for a variety of reasons. The arrangement relatively evenly balances the load across trailer 60. The arrangement also facilitates efficient loading and unloading of calibration vehicle 200 and of weights 310 (including weights 310 transported on trailer 70).

Trailer 70 is a flatbed trailer with a floor 69B. Weight bin 300B is securely fastened to floor 69B near the back of trailer 70. Weight bin 300B contains multiple calibrated weights 310. In one aspect, bin 300B has capacity to store 24 weights 310 (however other capacities for bin 300B are also contemplated).

To satisfy a request for rail scale calibration, tractors 50A and 50B transport trailers 60 and 70 and their loads over roadways to the site of the rail scale. Upon arrival, trailers 60 and 70 are parked near railroad track that connects to the rail scale. The back of trailer 60 is also parked near the back of trailer 70 (which permits crane 400 to access weight bin 300B).

Subsequent to parking trailers 60 and 70, crane 400 is connected to spreader bar 250, which is connected to and rides inside calibration vehicle 200 during transport. As depicted in more detail, spreader bar 250 (depicted in FIG. 4) can be attached between the left side 204 and right side 205 of calibration vehicle 200 (depicted in FIG. 2) during transport. Crane 400 unloads (lifts) calibration vehicle 200 from trailer 69A and places calibration vehicle 200 on the railroad track. After calibration vehicle 200 is on the railroad track, spreader bar 250 is detached from calibration vehicle 200.

Crane 400 then uses spreader bar 250 to load a desired number of weights 310 into weight container 210 of calibration vehicle 200. For example, turning to FIGS. 4 and 5, crane 400 can positions hooks 252 through grip handles 314 of multiple weights 310 contained in bin 300A. Crane 400 unloads multiple weights 310 from weight bin 300A and loads the multiple weights 310 into container 210 of calibration vehicle 200. The weight transfer process continues until a desired amount of weight is placed in container 210. Container 210 has capacity to hold 36 weights 310 (however other capacities for container 210 are also contemplated). If bin 300A of does not have enough weights 310, then crane 400 unloads weights 310 from bin 300B and loads the weights 310 into container 200 of calibration vehicle 210. Since trailers 60 and 70 are parked back to back, crane 400 can efficiently load and unload weights 310 from bin 300B. The combined weight of calibration vehicle 200 and the weights 310 may be changed by adding weights 310 to or removing weights 310 from container 210.

Weights 310 can weigh any of a variety of weights. In one aspect, each of weights 310 weigh the same amount, such as, for example, 2000 pounds. However other weights for weights 310 are also contemplated. Further, at least some of weights 310 may vary in weight relative to one another.

When the combined weight of calibration vehicle 200 and weights 310 has a desired calibration value, such as, for example 80,000 pounds, calibration vehicle 200 is moved along the railroad track to the rail scale. The calibration vehicle is then used in a rail scale calibration process. Rail scale calibration processes are described in NIST Handbook 44 and AAR Scale Handbook.

Figure 2:
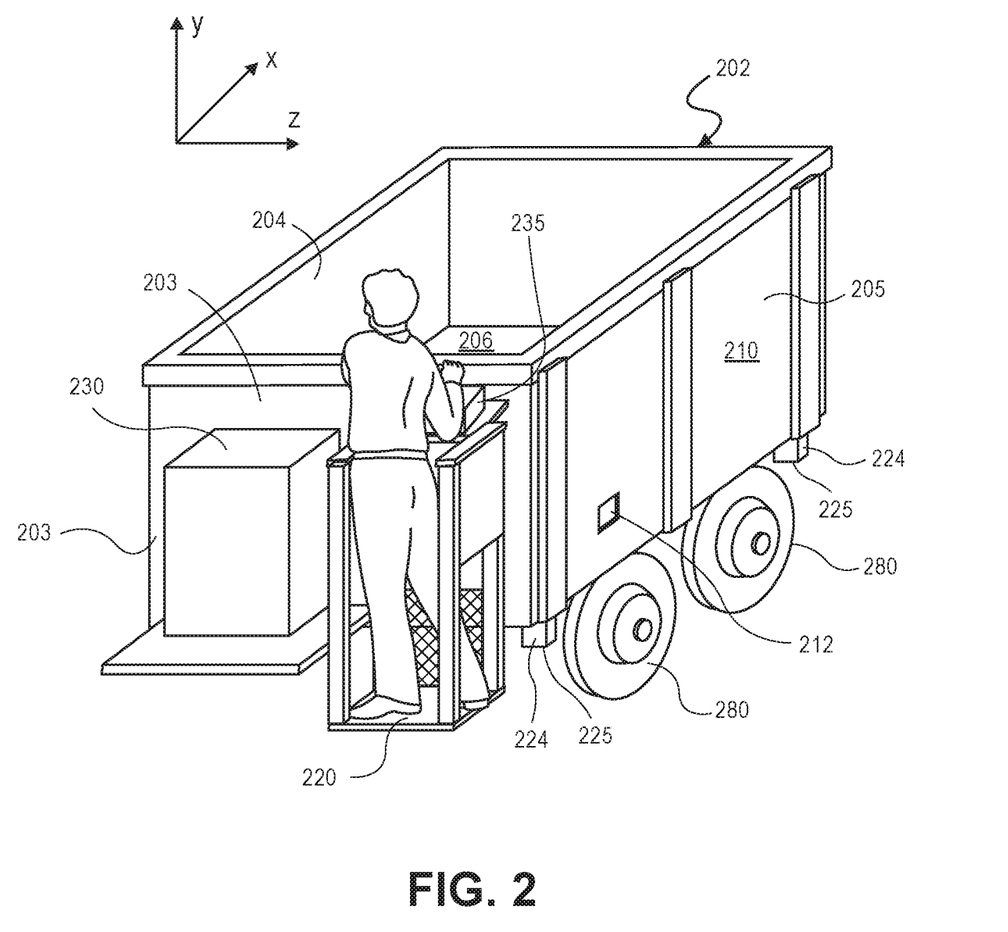
FIG. 2 depicts additional example details of the calibration vehicle.

FIG. 2 depicts additional example details of the calibration vehicle 200. As depicted, calibration vehicle 200 includes container 210, engine 230 and four train wheels 280. Container 210 is formed by a front side 202, a back side 203, a left side 204, a right side 205, and a bottom 206. The sides are made of steel and welded together to form box-shaped container 210. The right side 205 and the left side 204 each have a receiver 212 (not shown on side 204), Receivers 212 have a square shape and are defined by edges of the sides where material is removed as depicted on right side 205.

Figure 4:
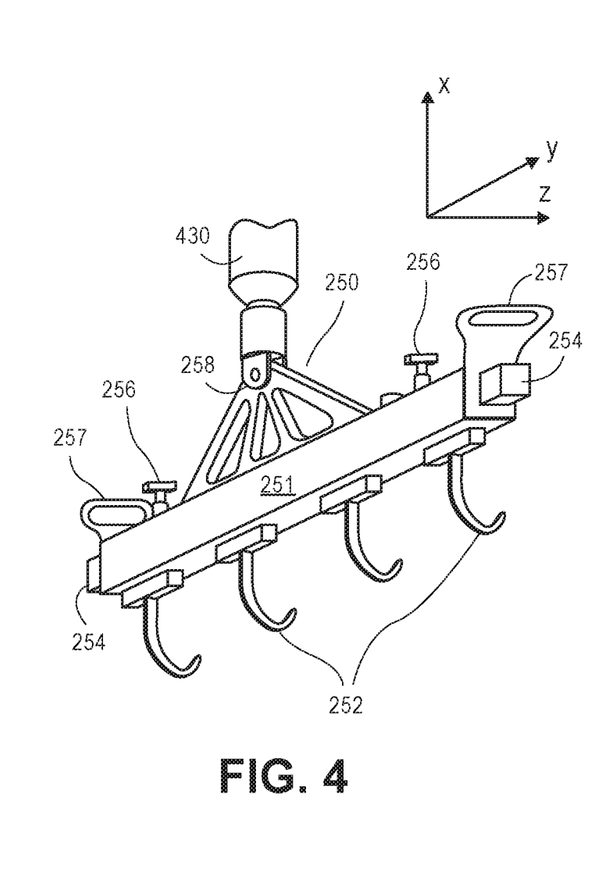
FIG. 4 depicts additional example details of a spreader bar.
Figure 5:
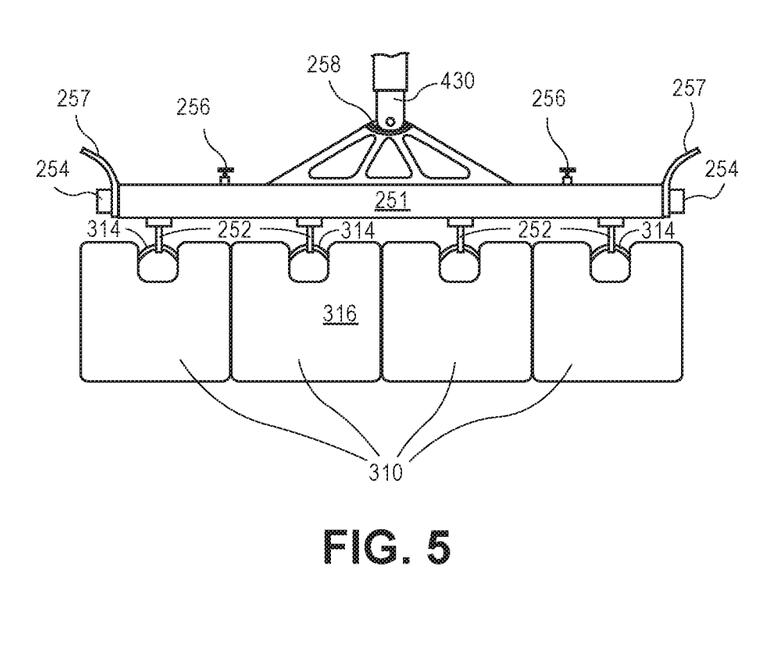
FIG. 5 depicts the spreader bar coupled to a plurality of weights.

The (e.g., square) shape of receiver 212, is dimensioned to receive coupling bar 254 of spreader bar 250 as shown in FIG. 4. A line drawn in the z-direction between the centers of the receivers 212 intersect the approximate center of gravity of calibration vehicle 200. The combination of the location and shape of receivers 212 reduces or nearly eliminates rotational torque that can cause the calibration vehicle to rotate when crane 400 moves calibration vehicle 200 from trailer 60 to railroad track rails and/or from railroad track rails to the trailer 60.

Calibration vehicle 200 can be self-propelled by engine 230. An operator standing on platform 220 can start engine 230 and control the speed of calibration vehicle 200 on a railroad track using controls 235. In one aspect, engine 230 is an internal combustion engine and is started with a battery. Controls 235 have at least the means for initiating the start of engine 230, engaging a drive linkage, and controlling the speed of calibration vehicle 200. Calibration vehicle 200, when empty and with a fixed amount of fuel, is certified to a specified weight, such as, for example, 8000 pounds. As such, the only variable weight may be the weight of the operator. To remove the operator from calibration vehicle weight consideration, controls 235 may be reached by an operator standing or walking next to the side of calibration vehicle 200.

Further, as depicted in FIG. 2, calibration vehicle 200 has four sleeves 224 located at each corner of container 210 and extending downward in the negative y-direction (a sleeve at the corner of side 203 and side 204 and a sleeve at the corner of side 202 and 204 are not shown). Sleeves 224 have square openings that are configured to engage fingers 284 that extend upward from calibration vehicle retainer 282 as depicted in FIG. 1. Edges 225 of sleeves 224 rest on shoulders 286 of calibration vehicle retainer 282 when the calibration vehicle 200 is positioned for transport on trailer 60. In addition, conventional tiedowns can be used to anchor calibration vehicle 200 to the trailer 60 and ensure safe transport of calibration vehicle 200.

In FIG. 1, calibration vehicle 200 is depicted somewhat above retainer 282. As such, sleeves 224 do not cover fingers 284 and fingers 284 visible. In this view, train wheels 280 are not resting on retainer 282 but instead are above retainer 282. Retainer 282 is marginally wider than calibration vehicle 200. Thus, when calibration vehicle 200 is at rest on floor 69A, retainer 282 would obscure view of the lower portion of train wheels 280 and train wheels would not be fully visible from the perspective in FIG. 1. However, the blow up circular view depicts a sleeve 224 at rest on retainer 282 when calibration vehicle 200 is in transport position. That is, calibration vehicle 200 is in contact with floor 69A.

Crane 400 mounted on the trailer 60 is configured, by its position on the back section 66 of the trailer and based on crane manufacturers specifications, to lift the calibration vehicle from trailer 60 to track rails and vice versa and to lift groups of weights from bins 300 to the weight container 210 of calibration vehicle 200 and vice versa. Crane 400 can be any type of trailer mountable crane, such as, for example, a Palfinger Model PK40002EH made Austria or other comparable cranes. Crane 400 can be anchored to section 66 of trailer 60 and is therefore available when trailers 60, 70 travel to a site for calibration of a rail scale. In one aspect, crane 400 transfers multiple weights 310 or calibration vehicle 200 between trailers and the railroad track (or vice versa), wherein the maximum load on the crane is around 8000 pounds.

Figure 3:
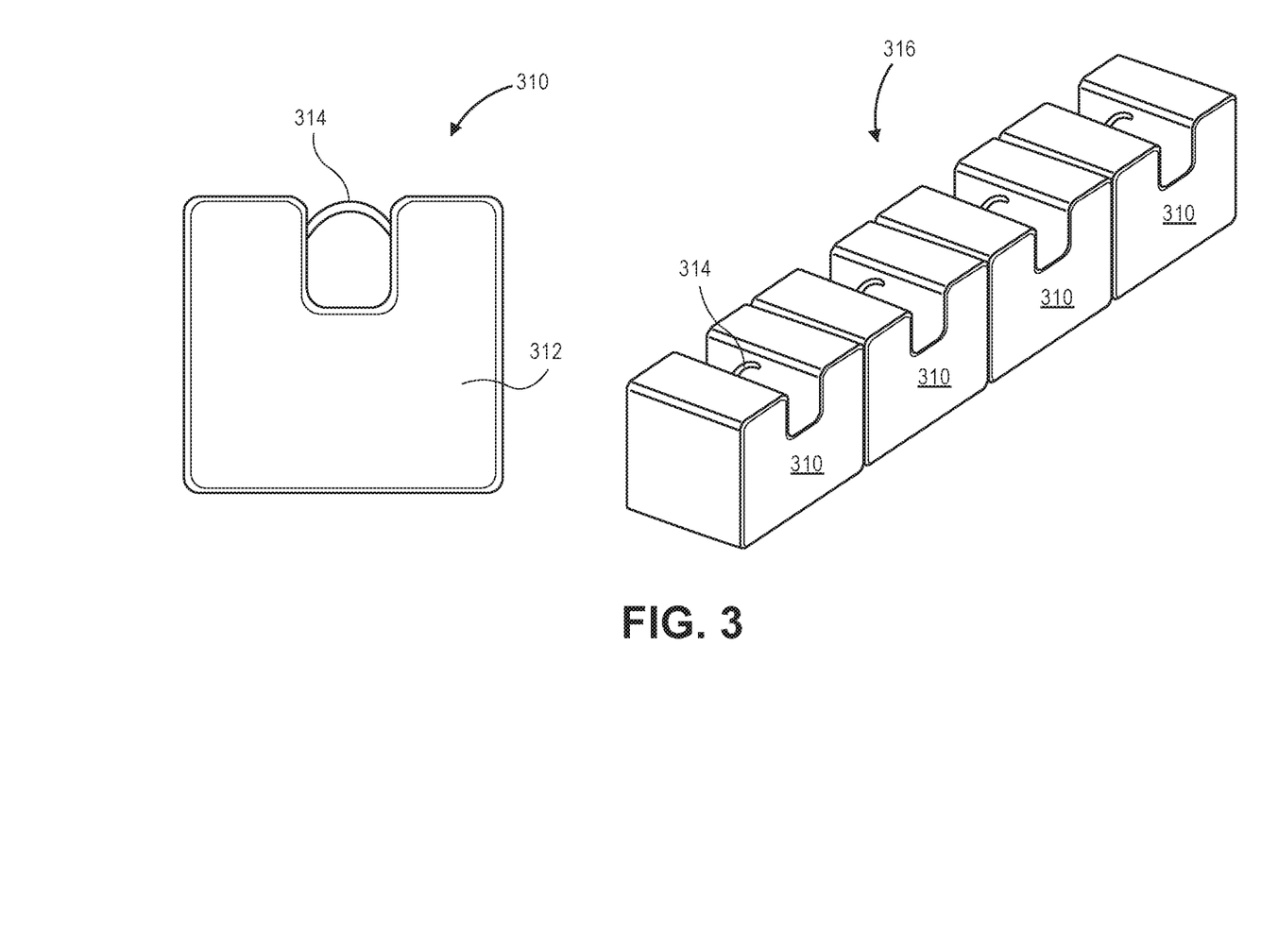
FIG. 3 depicts additional example details of the weights.

FIG. 3 depicts additional example details of the weights 310. Weight 310 has a block-shaped body 312 and an embedded grip handle 314. Body 312 of weight 310 can be made of cast iron and coated with a protective material. Weight 310 may be commercially available from a weight vendor, such as, for example, Larson Systems, Inc. of Ham Lake, Minn. Such commercially available weights may have certified weight values ranging from a few pounds up to several thousand pounds. In one aspect, each weight 310 has a certified weight of 2000 pounds. When multiple weights 310 are positioned side-by-side, a row of weights 316 is formed, shown with 4 weights 310 in FIG. 3.

When crane 400, using spreader bar 250, moves a row of weights 316, the time required load and unload calibration vehicle 200 is reduced (relative to moving individual weights 310), thereby reducing setup and breakdown time at a rale scale site. Bin 300A can be configured to hold 16 weights 310 and bin 300B can be configured to hold 20 weights 310. The weights 310 can be arranged in the bins 300A and 300B as rows of weights 316. As such, bin 300A can have a 4 by 4 arrangement of weights 310 and bin 300B can have a 4 by 5 arrangement of weights 310. In one aspect, the combined weight of weights 310 in both bins 300A and 300B is 72,000 pounds. When the weight of calibration vehicle 200, 8,000 pounds, is added to the weight of 36 weights 310, a certified weight of 80,000 pounds is available for rail scale calibration. That certified weight moves along the track rails by self-propelled calibration vehicle 200.

FIG. 4 depicts additional example details of spreader bar 250. Spreader bar 250 provides at least two functions: (a) a calibration vehicle coupling for attaching calibration vehicle 200 to crane 400 and (b) a weight coupling for grasping multiple weights 310 (e.g., a row of weights 316) by crane 400. Spreader bar 250 includes a beam 251 with hooks 252 extending perpendicularly from the bottom of the beam. The hooks 252 are spaced and oriented so that they may grasp row of weights 316 and move the weights via crane 400 from bins 300A and 300B to container 210 of calibration vehicle 200 or vice versa.

Beam 251 has a square tube-shaped cross section and a coupling bar 254 extends from each end of the beam as shown in FIG. 4. Coupling bar 254 has a square shape and is configured to slide within beam 251. A pull pin 256 locks coupling bar in a desired position. The coupling bar 254 has an extended position and a retracted position. In the extended position, coupling bars 254 is extended and can engage with receivers 212 to connect the spreader bar 250 to calibration vehicle 200. A pull pin 256 locks each coupling bar 254 in a receiver 212 so the crane 400 can move calibration vehicle 200. In the retracted position, coupling bars 254 are moved towards the center of beam 251 and locked in position by pull pin 256. When coupling bars 254 are retracted the length of spreader bar 250 is reduced so that spreader bar 250 can fit between the left side 204 and right side 205 of weight container 210 and between sides of bins 300A and 300B.

In either the extended position or retracted position coupling bars 254 can be locked into that position by pull pin 256. Handles 257 provide a handy grip so an operator can slide the coupling bar 254 to either the retracted or extended position when pull pin 256 is released. Spreader bar 250 has a coupling 258 for connecting the spreader bar 250 to crane coupling 430.

Figure 6:
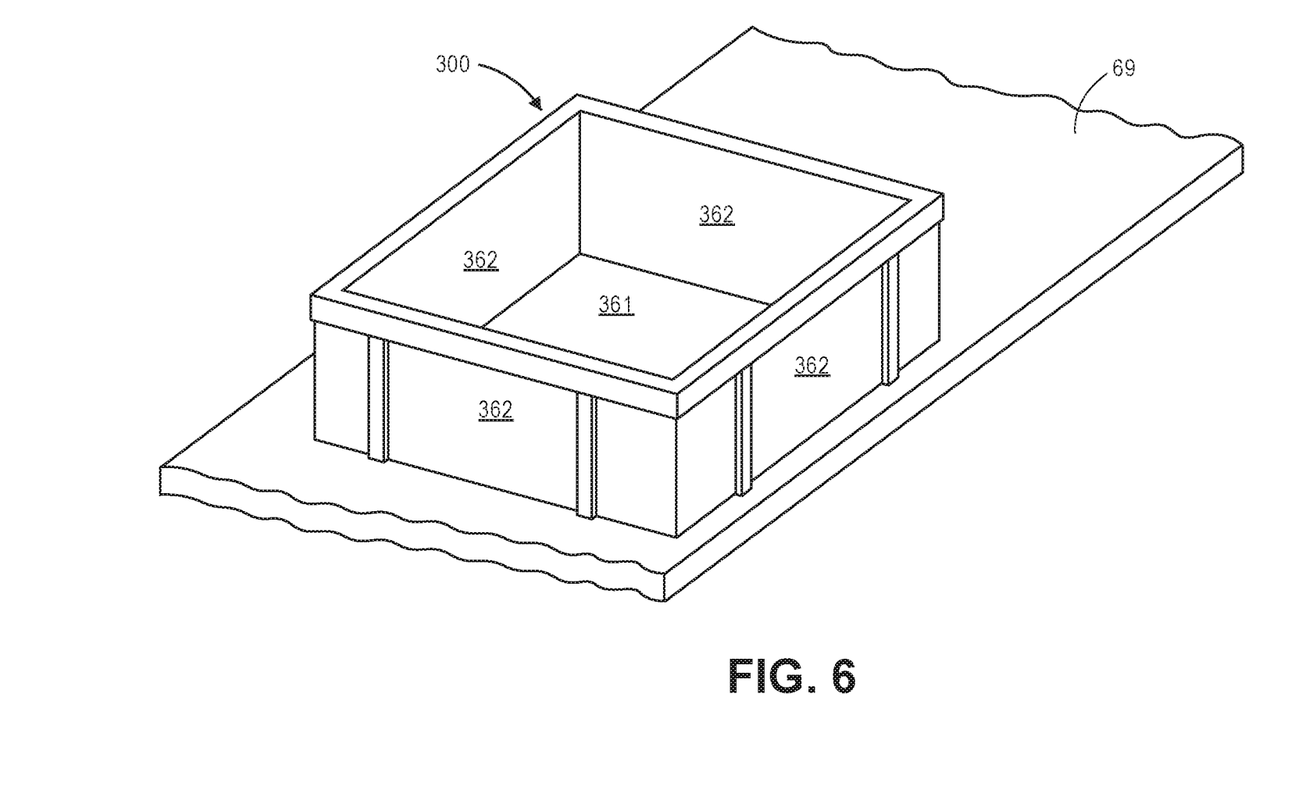
FIG. 6 depicts an example bin for storing weights.

FIG. 6 depicts an example bin 300 for storing weights. Bin 300 (e.g., bin 300A or 300B) rests on and is secured to floor 69 (e.g., floor 69A or 69B) of a trailer (e.g., trailer 60 or 70). Bin 300 comprises sides 362 and bottom 361 forming an open box shape. Bin 300 secured to floor 69 of the trailer holds, for example, 16 or 20, weights 310. As described, weights 310 can be arranged as rows of weights 316 when stored in bins 300A and 300B. Bin 300A can have 4 rows of weights and bin 300B can have 5 rows of weights. In the arrangements as described, spreader bar 250 can gasp a row of weights 316 and transfer the weights between bins 300A and/or 300B and calibration vehicle 200 or vice versa. Moving multiple weights in this manner improves the efficiency (i.e., reduces the time) of loading and unloading calibration vehicle 200, and thus reduces the time of a rail scale calibration process. In one aspect, weights are moved from bins 300A and 300B to container 210 of calibration vehicle 200 with 9 round trips of crane 400 (4 from bin 300A and 4 from bin 300B).

Figure 7:
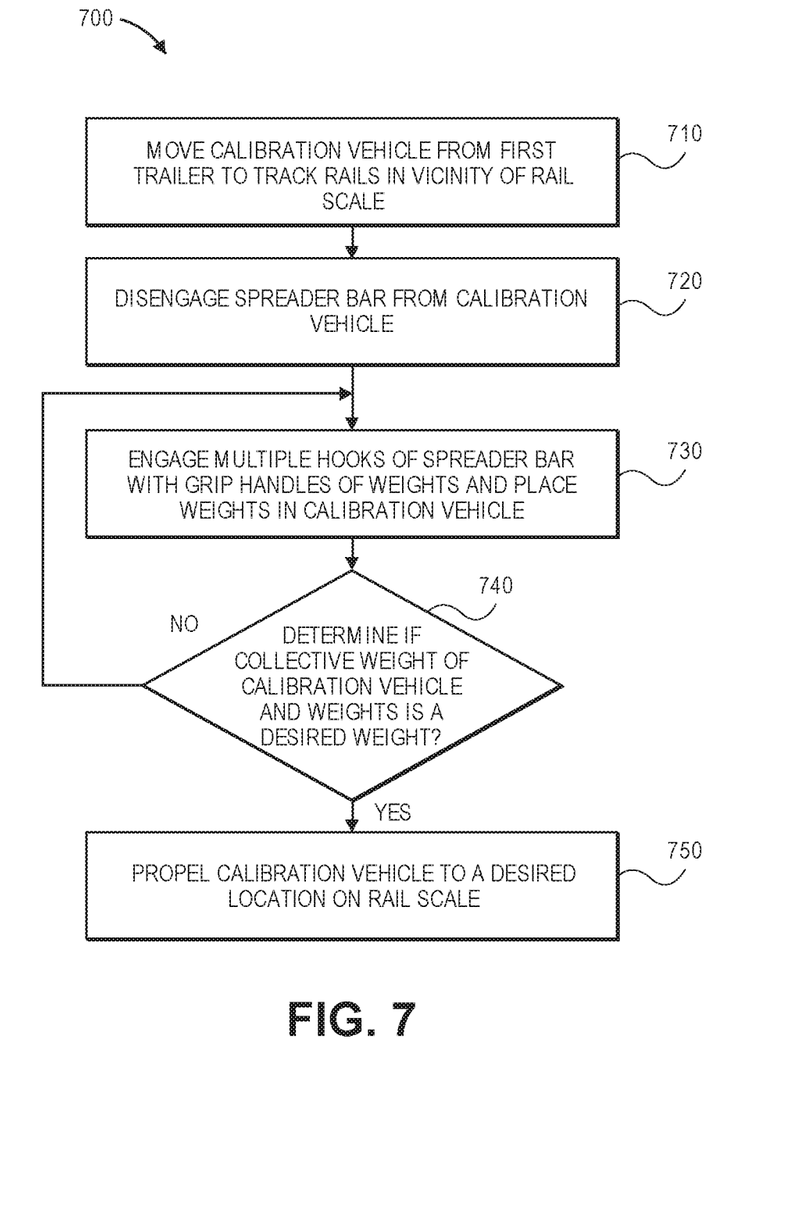
FIG. 7 depicts a flow chart of an example method for preparing a calibration vehicle for a rail scale calibration test.

FIG. 7 depicts a flow chart of an example method 700 for preparing a calibration vehicle for a rail scale calibration test. Method 700 will be described with respect to the components depicted in FIGS. 1-6.

As described, trailer 60 and trailer 70 can be pulled by tractors 50A and 50B respectively to a rail scale site. The trailers 60, 70 are positioned at the rail scale site so that trailers 60 and 70 are close to one another and so that crane 400 is close to track rails that extend to the rail scale. Calibration vehicle 200 with multiple weights 310 are a certified calibration vehicle and available for rail scale calibration when placed on the track rails.

Method 700 includes moving a calibration vehicle from a first trailer to track rails in the vicinity of a rail scale (710). For example, calibration vehicle 200 can be lifted off of shoulders 286 and moved from trailer 60 to track rails in vicinity of a rail scale (e.g., to track rails on the property of the rail scale owner). Spreader bar 250 can be transported inside container 210 and in an extended position with coupling bars 254 inserted into receivers 212. An operator can attach crane couple 430 to spreader bar coupling 258. Next, crane 400 can lifts calibration vehicle 200 from trailer 60 and places the train wheels 280 of calibration vehicle 200 on the track rails.

Method 700 includes disengaging the spreader bar from the calibration vehicle (720). For example, an operator can pull pin 256 and use a handle 257 to slide (retract) each coupling bar 254 into beam 251. The operator can then release pin 256 to lock coupling bar 254 in the retracted position. When coupling bars 254 are locked in the retracted position, spreader bar 250 fits within bins 300A and 300B and within container 210 of calibration vehicle 200.

Method 700 includes engaging multiple hooks of the spreader bar with grip handles of weights and placing the weights in the calibration vehicle (730). For example, crane 400 can be operated to engage multiple hooks 252 of spreader bar 250 with grip handles 314 of multiple corresponding weights 310 (e.g., in a row of weights 316) from bin 300A or 300B. Crane 400 can place the weights 310 in container 210 of calibration vehicle 200. Crane 400 can then be operated to disengage the multiple hooks 252 from the multiple weights 310, leaving the multiple weights 310 in container 200.

Method 700 includes determining if the collective weight of the calibration vehicle and weights is a desired weight (740). For example, it can be determined if the collective weight of vehicle 200 and weights 310 contained in container 210 is appropriate for calibrating a rail scale. If the collective weight of the calibration vehicle and weights is not a desired weight (NO at 740), method 700 returns to 730. Thus, crane 400 can move more weights 310 from bin 300A or bin 300B into container 210. Transfer of weights 310 can continue until a desired weight is achieved.

If the collective weight of the calibration vehicle and weights is a desired weight (YES at 740), method 700 includes propelling the calibration vehicle to a desired location on a rail scale (750). For example, calibration vehicle can be propelled on track rails to a rail scale. Calibration vehicle 200 can be propelled by engine 230 when an operator works controls 235. In an exemplary embodiment a desired certified weight is 80,000 pounds. Other attainable certified weights range between 8,000 and 80,000 pounds, for example, in increments of 2,000 pounds.

Upon completion of a rail scale calibration/certification, calibration vehicle 200 moves from along track rails from the rail scale location back to the vicinity of the trailers 60, 70.

Figure 8:
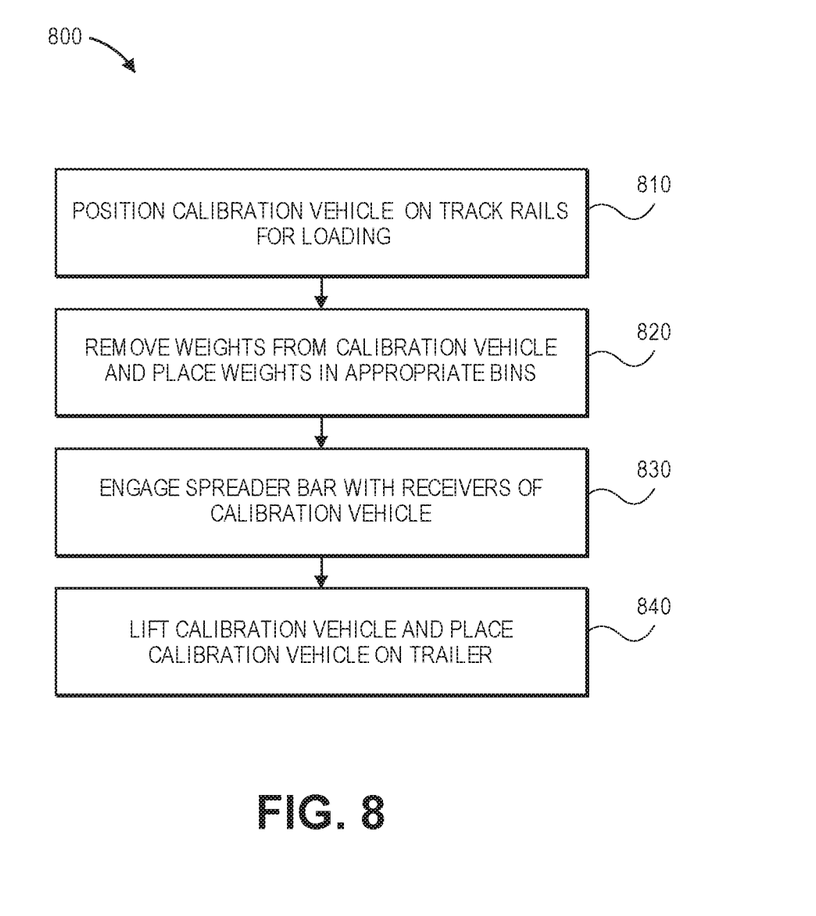
FIG. 8 depicts a flow chart of an example method for preparing a calibration vehicle for transport.

FIG. 8 depicts a flow chart of an example method 800 for preparing a calibration vehicle for transport. Method 800 will be described with respect to the components depicted in FIGS. 1-6.

Method 800 includes positioning a calibration vehicle on track rails for loading (810). For example, upon completion of a rail scale calibration/certification process, calibration vehicle 200 can be moved along track rails from the rail scale location back to the vicinity of the trailers 60, 70. Calibration vehicle 200 can be propelled by engine 230 when an operator works controls 235.

Method 800 includes removing weights from the calibration vehicle and placing the weights in appropriate bins (820). For example, weights 310 can be removed from container 210 and placed in bin 300A and/or bin 300B. Crane 400 can position spreader bar 250 so hooks 252 engage grip handles 314 of multiple weights 310 (e.g., a row of weights 316). Crane 400 can lift weights 310 out of container 210 and place the weights in either bin 300A or bin 300B. Crane 400 can then disengage hooks 252 from grip handles 314, leaving the multiple weights 310 in bin 300A or 300B. Crane 400 can remove multiple weights from container 210 and place them in appropriate bins 300A or 300B until container 210 is empty.

Method 800 includes engaging the spreader bar with receivers of the calibration vehicle (830). For example, after all weights 310 are removed from container 210, crane 400 positions spreader bar 250 between receivers 212 of the container 210. An operator can pull pin 256 and use a handle 257 to slide (extended) each coupling bar 254 out of beam 251 into a corresponding receiver 212 (in side 204 and in side 205). The operator can then release pin 256, locking the coupling bar 254 in the extended position and engaged with receiver 212.

Method 800 includes lifting the calibration vehicle and placing the calibration vehicle on a trailer (840). An operator can attach crane couple 430 to spreader bar coupling 258. Next, crane 400 can lift calibration vehicle 200 (supported by spreader bar 250) from the track rails. Crane 400 can move calibration vehicle 200 above retainer 282. Crane 400 can lower calibration vehicle 200 so that sleeves 224 are placed on shoulders 286 and fingers 284 engage with sleeves 224.

Retainer 282 ensures that calibration vehicle 200 is always positioned at the same location on middle section 64 of trailer 60. In addition, retainer 282 prevents train wheels 280 from resting on and possibly damaging either train wheels 280 or the floor 69A. Spreader bar 250 remains attached to calibration vehicle 200 when trailer 60 is moved to another site. For transit, crane 400 is configured to a transport position. Tiedowns are then attached and secured as needed and the trailers 60, 70 are ready to move to another rail scale calibration site.

Accordingly, aspects of the invention provide an efficient and timely way to calibrate rail scales. If there is an immediate need for rail scale calibration, two operators can drive the tractor/trailers to the rail scale site. After the trailers are parked next to the track rails, the unloading of the calibration vehicle and weights takes around 10 round trips for crane 400 between the trailers and the train rails and can be done in around 15 minutes. For a rail scale a few miles away the entire calibration process may take just a few hours. If the tractor/trailers can be derived closer to the rail scale site, a calibration process can take (potentially significantly) less time. Accordingly, aspects of the invention can save days or even weeks of time associated with transporting a calibration vehicle to a rail scale site.

Further, although specific embodiments of the invention have been described and illustrated, the invention is not to be limited to the specific forms or arrangements of parts so described and illustrated. The scope of the invention is to be defined by the claims appended hereto, any future claims submitted here and in different applications, and their equivalents.

What is claimed:

1. An apparatus for railroad scale calibration comprising a first trailer including a crane and a second trailer, the first trailer and second trailer positioned next to one another and next to railroad track rails that extend to a railroad scale such that the crane is within range of the first trailer, the second trailer, and the railroad track rails, the apparatus including:
   a calibration vehicle coupled to a middle section of the first trailer, the calibration vehicle including a platform, railroad track wheels attached to the bottom of the platform and configured to engage the railroad track rails, an engine with controls for propulsion of the calibration vehicle along the railroad track rails, and at least a first wall and a second wall forming a container on the top of the platform, the first wall including a first receiver configured to receive a coupling bar of a spreader bar and the second wall including a second receiver configured to receive another coupling bar of the spreader bar;
   the spreader bar attached to and stored in the first receiver and the second receiver;
   a first bin coupled to a front section of the first trailer and configured to hold first weights;

the first weights having grip handles stored in the first bin;
a second bin coupled to the second trailer and configured to hold second weights;
the second weights having grip handles stored in the second bin; and
the crane mounted to a back section of the first trailer, wherein the crane is configured to position the calibration vehicle from the middle section onto the railroad track rails engaging the railroad track wheels with the railroad track rails, and is configured to transfer one or more of: the first weights from the first bin to the container or the second weights from the second bin to the container using corresponding hooks.

2. The apparatus of claim 1, wherein the calibration vehicle has sleeves that engage with arms of a calibration vehicle retainer, wherein the calibration vehicle retainer is attached the first trailer.

3. The apparatus of claim 1, wherein the spreader bar has four hooks configured to gasp four weights simultaneously.

4. The apparatus of claim 3, wherein the spreader bar includes a first extension bar configured to lock into a receiver in the first wall and a second extension bar configured to lock into a receiver in the second wall.

5. The apparatus of claim 1, wherein the calibration vehicle, the first weights, and the second weights each have certified weight values permitting weight combinations varying from eight thousand pounds to eighty thousand pounds.

6. The apparatus of claim 1, wherein the first bin holds sixteen weights in a 4 by 4 arrangement and the second bin holds 20 weights in a 4 by 5 arrangement.

7. An apparatus for railroad scale calibration wherein a railroad scale is coupled to railroad track rails, the apparatus comprising:
a trailer including a front section with a coupling for connection to a tractor, a middle section and a back section;
a weight bin mounted on the front section of the trailer;
a plurality of weights contained in the weight bin, each weight including a grip handle;
a calibration vehicle coupled to the middle section of the trailer, the calibration vehicle including a platform, railroad track wheels attached to the bottom of the platform and configured to engage the railroad track rails, a propulsion system for moving the calibration vehicle along the railroad track rails, a first wall including a first receiver, and a second wall including a second receiver, at least the first wall and the second wall forming a container on top of the platform;
a crane mounted on the back section of the trailer, wherein the crane is configured to position the calibration vehicle from the middle section onto the railroad track rails engaging the railroad track wheels with the railroad track rails and configured to transfer the weights between the weight bin and the container using a spreader bar; and
the spreader bar including: a connector for coupling to the crane, hooks for coupling to the grip handles of the plurality of weights, a first extension bar configured to couple into the first receiver, and a second extension bar configured to couple into the second receiver.

8. The apparatus of claim 7, wherein the apparatus weighs less than 72,000 pounds.

9. The apparatus of claim 7, wherein each weight including in the plurality of the weights has a calibrated value of 2000 pounds.

10. A method comprising:
attaching a crane on a trailer to a spreader bar that includes a plurality of hooks, the spreader bar mechanically coupled to a first receiver in a first container wall and a second receiver in a second container wall, the first container wall and the second container wall at least in part forming a container included in a calibration vehicle positioned on the trailer, the trailer adjacent to but not on railroad track rails that extend to a railroad scale;
using the crane for lifting the spreader bar and for moving the calibration vehicle off of the trailer onto the railroad track rails;
disengaging the spreader bar from both the first receiver and the second receiver;
using the crane for engaging the plurality of hooks with grip handles of a corresponding plurality of weights on the trailer and for moving the plurality of weights from the trailer into the container;
determining the calibration vehicle and the plurality of weights have a desired weight; and
propelling the calibration vehicle along the railroad track rails to a desired location on the railroad scale.

11. The method of claim 10, wherein the disengaging the spreader bar from both the first receiver and the second receiver comprises:
releasing a first coupling bar of the spreader bar from the first receiver;
locking the first coupling bar inside the spreader bar in a retracted position;
releasing a second coupling bar of the spreader bar from the second receiver; and
locking the second couple bar inside the spreader bar in a retracted position.

12. The method of claim 10, wherein the moving the calibration vehicle off the trailer onto the railroad track rails comprises:
detaching the calibration vehicle from a plurality of retaining posts on the trailer; and
aligning railroad track wheels of the calibration vehicle with the railroad track rails.

13. The method of claim 10, further comprising subsequent to the propelling the calibration vehicle to the desired location:
propelling the calibration vehicle along the railroad track rails to a second desired location near the trailer;
using the crane for engaging the plurality of hooks with the grip handles of the corresponding plurality of weights in the container for moving the plurality of weights from the container to the trailer;
mechanically coupling the spreader bar to the first receiver and to the second receiver; and
using the crane for lifting the spreader bar and for moving the calibration vehicle off of the railroad track rails and onto the trailer.

14. The method of claim 13, wherein the propelling the calibration vehicle to the second desired location comprises:
propelling the calibration vehicle within range of the crane.

15. The method of claim 13, wherein the mechanically coupling the spreader bar to the first receiver and to the second receiver comprises:
locking a first coupling bar of the spreader bar into an extended position outside the spreader bar;
attaching the first coupling bar to the first receiver;
locking a second coupling bar of the spreader bar into an extended position outside the spreader bar; and
attaching the second coupling bar to the second receiver.

16. The method of claim 13, wherein the moving the calibration vehicle off of the railroad track rails and onto the trailer comprises attaching the calibration vehicle to a plurality of retaining posts on the trailer.

17. The apparatus of claim 1, wherein the first wall including a first receiver and the second wall including a second receiver comprises the combination of: (a) the location and shape of the first receiver and (b) the location and shape of the second receiver configured to reduce rotational torque when the crane positions the calibration vehicle.

* * * * *